Nov. 9, 1965 L. N. STRAIN 3,217,226
BATTERY CHARGERS
Filed April 18, 1961

INVENTORS
LOUIS N. STRAIN

BY Arnold & Roylance
ATTORNEYS

United States Patent Office 3,217,226
Patented Nov. 9, 1965

3,217,226
BATTERY CHARGERS
Louis N. Strain, 24 Sea Spray Drive, Centerport, R.D. 5, Huntington, Long Island, N.Y.
Filed Apr. 18, 1961, Ser. No. 103,871
11 Claims. (Cl. 320—48)

This invention relates to battery chargers and more particularly to improvements in charging apparatus of the general type employed for charging storage batteries in service stations, garages, industrial installations and the like.

It has long been known to employ in storage battery chargers various types of automatic controls for terminating charging. Thus, it is common to employ a time switch which can be adjusted by the operator to interrupt charging automatically at the end of a selected period. Also, many types of chargers have been provided with special control circuits for terminating charging automatically in accordance with such variables as the temperature of the electrolyte of the battery being charged and the terminal voltage of the battery. In all such devices heretofore proposed, however, the control means has been so designed and constructed as to terminate charging upon occurrence of a predetermined condition, such as time, temperature or voltage, which is estimated, either by the operator or by the designer of the charger, to occur only after the charger has supplied the battery with an adequate charge, such estimate assuming that the battery is not defective.

With such prior art charging apparatus, the result of a complete cycle of charging operation on a given battery is either successful, in the sense that the battery reaches a satisfactory level of charge, or unsuccessful, in the sense that the battery is not adequately charged, even for practical purposes, when the charger is automatically de-energized. Under usual circumstances, the person operating the battery charger has little technical skill and is completely unable to estimate the actual condition of the battery. Accordingly, if the battery being charged does not come up to charge, the operator does not ordinarily know whether the battery is defective or can be successfully subjected to further charging. It is, of course, common practice to employ various types of battery testing apparatus, for use in conjunction with the battery charger, to aid the operator in estimating the condition of the battery. However, because the operator usually lacks technical skill, it is difficult to provide inexpensive testing apparatus which will allow the operator to properly handle all batteries in a simple, expedient and economical fashion.

A general object of the present invention is to provide a battery charger so constructed and arranged that it will not only be automatic in its charging operation but will also, as a result of its automatic action in charging the battery, clearly indicate to the operator what action should be taken with respect to the battery after charging has been terminated. In effect, chargers constructed in accordance with the preesnt invention inform the operator whether the battery is in satisfactory condition after charging or should be subjected to certain specific further treatments.

Another object of the invention is to provide an automatic battery charger capable of satisfactory charging storage batteries even though the conditions of the various batteries to be charged may vary widely.

A further object is to provide a battery charger of such nature as to require a minimum of skill on the part of the operator.

In order that the manner in which these and other objects are attained in accordance with the invention can be understood in detail, reference is had to the accompanying drawings, which form a part of this specification, and wherein.

Figure 1:
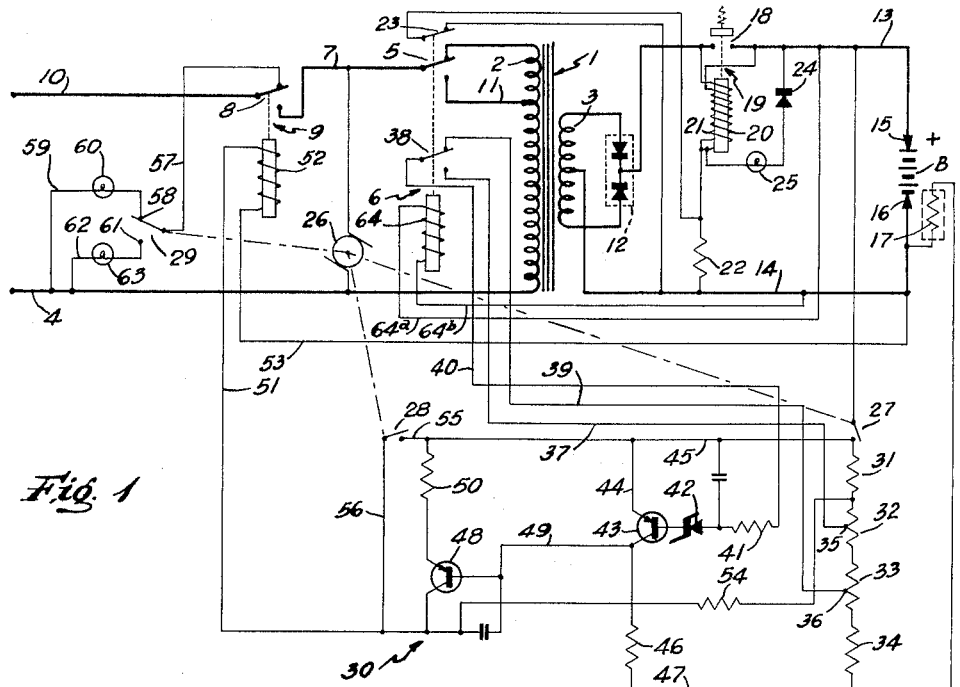
FIG. 1 is a schematic diagram of a battery charger constructed in accordance with one embodiment of the invention.

Referring now to the drawings in detail, and first to FIG. 1 thereof, it will be seen that the battery charger here illustrated comprises a transformer 1 having a primary winding 2 and a center tapped secondary winding 3. Supply conductor 4 is connected to one end terminal of primary winding 2, the other end terminal of this winding being connected to the normally closed fixed contact of a single pole double throw contact set 5 of a charger rate selector relay 6. The movable contact of contact set 5 is connected via conductor 7 to the normally open fixed contact of the single pole double throw contact set 8 of a relay 9 which, as later explained, responds to occurrence of a desired predetermined terminal voltage of the battery B to be charged. The movable contact of contact set 8 is connected to supply conductor 10, conductors 4 and 10 being connectable to a suitable alternating current source (not shown). The normally open fixed contact of contact set 5 is connected via conductor 11 to a tap on primary winding 2.

A center tapped rectifier 12 is connected across secondary winding 3, one charging lead 13 being connected to the center tap of the rectifier and the second charging lead 14 being connected to the center tap of secondary winding 3. Leads 13 and 14 terminate in connector clamps, indicated at 15 and 16, respectively, clamp 16 advantageously being constructed in accordance with co-pending application Serial No. 58,856 filed August 25, 1960, by James B. Godshalk and Lewis A. Medlar, now Patent No. 2,979,650, issued April 11, 1961, and embodying a thermally responsive resistance 17.

The normally open contacts 18 of a bifilar wound solenoid contactor 19 are interposed in lead 13, so that charging current can flow only after the contactor 19 is energized to closed condition. One winding 20 of the contactor is connected between leads 13, 14 on the rectifier side of contacts 18. The other winding 21 of the contactor is connected between leads 13, 14 on the battery side of contacts 18. As will be clear from the drawing, windings 20 and 21 are so wound and connected that they aid electromagnetically when battery B is connected with proper polarity for charging and oppose when battery B is connected with reverse polarity. The connection for both windings 20 and 21 includes, in series, a resistance 22, the resistance being normally short-circuited by normally closed contact set 23 of relay 6 but interposed in series with both windings 20, 21 when relay 6 is energized to open contact set 23.

The series combination of a rectifier 24 and an indicator lamp 25 is connected in parallel with winding 21, rectifier 24 being so oriented as to pass current from battery B, so energizing lamp 25, only when battery B is connected with a polarity opposite to that required for charging. In other words, rectifier 24 is poled to pass current from battery B only when the battery, through error, has been so connected that the battery voltage aids, rather than opposes, the flow of charging current from rectifier 12.

Contactor 19 is so designed and constructed that the electromagnetic effects of both windings 20, 21 are necessary to close contacts 18. Thus, if the battery B is connected with reverse polarity, the windings act in opposition and their net magnetic effect is inadequate to close contacts 18. Accordingly, under these conditions, charging current is prevented from flowing, and an indication of the wrong connection of battery B is given to the operator because lamp 25 is energized. On the other hand, when battery B is connected with the proper polarity for charging, windings 20 and 21 aid each other and their cumulative effect closes contacts 18 and charging proceeds. Under these conditions, lamp 25 is not energized because rectifier 24 does not pass current.

The battery charger employs a time switch device including a synchronous electrical driving motor 26 connected between conductors 4 and 7 so as to receive current from the A.C. source only when relay 9 is energized. Motor 26, as hereinafter described in detail, drives two cams, one controlling single pole single throw contact sets 27 and 28, the other controlling single pole double throw contact set 29.

Operation of relay 9 is accomplished by the control circuit indicated generally at 30. Circuit 30 includes a voltage divider comprising resistances 31–34 and 17 connected in series across battery B, as shown, and having alternatively employed output terminals 35, 36. Terminal 35 is connected by conductor 37 to the normally open fixed contact of a single pole double throw contact set 38 of relay 6, while terminal 36 is connected by conductor 39 to the normally closed fixed contact of contact set 38. The movable contact of contact set 38 is connected via conductor 40 and the series combination of resistance 41 and a Zener diode 42 to the base of a PNP type transistor 43.

The emitter of transistor 43 is connected to the positive end of the voltage divider, via conductors 44, 45, while the collector is connected, via resistance 46 and conductor 47, to the negative end of the voltage divider. A second PNP type transistor 48 has its base connected directly to the collector of transistor 43, via conductor 49. The emitter of transistor 48 is connected to conductor 45 and thus to the positive end of the voltage divider, via resistance 50. The collector of transistor 48 is connected by conductor 51 to one terminal of winding 52 of relay 9, the other terminal being connected via conductor 53 to negative charging lead 14. A resistance 54 is connected between the collector of transistor 48 and a point on the voltage divider between resistances 31 and 32, forming a positive feedback circuit.

Contact set 27 of the time switch device is interposed between resistance 31 and the positive terminal clamp 15, as shown, so that control circuit 30 can receive current from battery B only when contact set 27 is closed. Contact set 28 is connected to shunt transistor 48, via conductors 55, 56, so that winding 52 of relay 9 can be energized directly from the battery when both contact sets 27 and 28 are closed.

The movable contact of contact set 29 of the time switch device is connected to the normally closed fixed contact of contact set 8, by conductor 57. One fixed contact 58 of contact set 29 is connected by conductor 59 to A.C. supply conductor 4, an indicator lamp 60 being interposed in conductor 59, as shown, so that lamp 60 is energized from the A.C. source when relay 9 is de-energized while a movable contact of contact set 29 engages fixed contact 58. The other fixed contact 61 of contact set 29 is connected by conductor 62 to A.C. supply conductor 4, an indicator lamp 63 being interposed in conductor 62, as shown, so that lamp 63 is energized from the A.C. source whenever a movable contact of contact set 29 engages fixed contact 61 while relay 9 is de-energized.

The actuating winding 64 of relay 6 is connected between terminal clamps 15 and 16, and thus across battery B, by conductors 64a, 64b. Relay 6 is so designed and constructed as to be energized only when a battery having the higher of two predetermined voltage ratings is connected to terminal clamps 15 and 16. Thus, for example, the apparatus may be designed to charge both 6-volt and 12-volt storage batteries, in which case relay 6 will remain unenergized when the apparatus is connected to a 6-volt battery but will be energized whenever the apparatus is connected to a 12-volt battery. Upon energization of relay 6, contact set 5 serves to automatically adjust the connections of the transformer to provide the proper charging voltage, contact set 23 acts to insert resistance 22 in series with both windings of contactor 19, so that the proper voltage is applied to these windings, and contact set 38 adjusts the output of the voltage divider of circuit 30 in accordance with the higher voltage rating of the battery.

Assuming that contact set 27 is closed, control circuit 30 is operative to maintain relay 9 energized so long as the terminal voltage of battery B is below a predetermined value chosen as the cutoff voltage for the charger, it being understood that contact set 38 of relay 6 conditions circuit 30 automatically in accordance with the voltage rating of battery B. The voltage divider comprising resistances 31–34 and 17 provides, at either terminal 35 or 36, a voltage which is related to the voltage terminal of the battery. The voltage so provided is supplied to Zener diode 42, the Zener diode being so poled as to receive current from the battery only in the inverse (high resistance) direction. Regardless of whether the battery is a 6-volt or a 12-volt battery, the voltage applied to Zener diode 42 is caused to be in a given operating range determined by the characteristics of the diode, this being accomplished by the automatic selection of the proper one of output terminals 35, 36. Assuming that battery B has been properly connected to the charger and has a terminal voltage below the predetermined voltage selected as the cutoff voltage, the voltage applied to the Zener diode will be inadequate to cause the diode to conduct.

Under these circumstances, transistor 43 is fully nonconductive and transistor 48 is fully conductive. Since transistor 48 conducts, current flows through winding 52 of relay 9, so that contact set 8 completes the connection between conductors 7 and 10, and charging current can flow to the battery. As charging proceeds and the terminal voltage of the battery increases, the voltage derived from the voltage divider and applied to the Zener diode increases until it reaches the predetermined critical value for the diode. The Zener diode then becomes conductive. At the instant the diode becomes conductive, the current therethrough is just adequate to make transistor 43 conductive. The value of resistance 46 is so selected that the potential at the base of transistor 48 is at the edge of saturation for that transistor. Hence, a slight flow of current through transistor 48 causes the emitter-to-base potential of transistor 48 to decrease, resulting in a decrease in conductivity of transistor 48. As transistor 48 becomes less conductive, less current flows through the positive feedback circuit comprising resistance 54, and a greater voltage is accordingly applied from the voltage divided to Zener diode 42. The emitter-to-collector current of transistor 43 therefore increases still further, resulting in a further increase in the potential at the base of transistor 48. Transistor 48 is thus positively caused to be completely non-conductive and, assuming that contact set 28 is open, current flow through relay winding 52 is terminated. Accordingly, contact set 8 returns to its normal position, interrupting the flow of charging current.

As will now be described in detail, the time switch device comprising motor 26 operates through a one-hour cycle, maintaining contact set 27 closed for the full hour and opening the same at the end of the hour, maintaining contact set 28 closed for the first one-half hour and opening the same at the end of that period, maintaining the movable contact of contact set 29 engaged with fixed contact 58 for the first one-half hour plus thirty seconds, then maintaining that movable contact in engagement with fixed contact 61 until thirty seconds before termination of the one hour period, and then returning the movable contact of set 29 to engagement with fixed contact 58.

Figure 2:
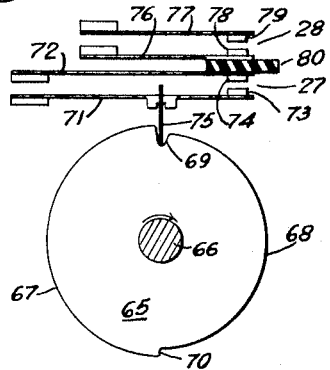
FIGS. 2 and 3 are fragmentary, simplified illustrations of two portions of a time switch device employed in the battery charger of FIG. 1.

Referring to FIG. 2, the time switch device comprises a first cam 65 which is fixed to and rotated by the shaft 66 driven by motor 26. Cam 65 includes a "high" arcuate peripheral surface portion 67, and an "intermediate" arcuate peripheral surface portion 68 and a notch 69 constituting the "low" point of the cam. Portions 67 and 68 each extend for substantially 180° and are joined by shoulder 70. The time switch device being constructed to rotate shaft 66 through one revolution per hour when motor 26 is energized, surface portions 67 and 68 provide, in effect, one-half hour time periods.

Contact set 27 surprises a pair of normally parallel spring arms 71 and 72 each fixed at one end and carrying contacts 73 and 74, respectively, at their other ends. Spring arm 71 carries a cam follower 75, constructed and arranged in any conventional fashion, to operatively engage the peripheral surface of cam 65. Contact set 28 comprises a pair of normally parallel spring arms 76 and 77 each fixed at one end and carrying cooperating contacts 78 and 79, respectively at their other ends. At their contact-carrying ends, spring arms 72 and 76 are mechanically joined by insulating block 80.

Cam 65, spring arms 71, 72 and 76, 77, and follower 75 are so constructed and arranged that, when follower 75 is engaged with portion 67 of the cam, the spring arms are distorted in such fashion that both contact sets 27 and 28 are maintained closed. However, as cam 65 is rotated to bring shoulder 70 past follower 75, so that the follower now engages cam portion 68, contact set 28 is allowed to open and contact set 27 is retained in closed condition. As the cam completes one full revolution, and follower 75 engages in notch 69, contact set 27 is allowed to open. It will thus be understood that the mechanism illustrated in FIG. 2 is operative to maintain contact set 27 closed for the full one hour period of operation of the time switch device and to maintain contact set 28 closed only for the first one-half hour of that period.

Figure 3:
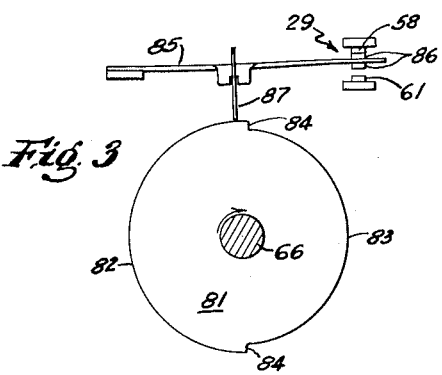

The time switch device also comprises a second cam 81, FIG. 3, which is also fixed to and rotated by shaft 66 driven by motor 26. Cam 81 is generally circular, having a first, longer arcuate "high" peripheral surface portion 82 and a second, shorter arcuate "low" peripheral surface portion 83. Thus, surface portions 82 and 83 are separated by shoulders 84. Contact set 29 comprises a spring arm 85 which is fixed at one end and carries oppositely facing movable contacts 86 at its other end. As shown, fixed contacts 58 and 61 are operatively positioned with respect to the movable contacts 86, in conventional fashion. Spring arms 85 carries a follower 87 disposed in engagement with the peripheral surface of cam 81. Cam 81, contact set 29 and follower 87 are so constructed and arranged that, when follower 87 is engaged with cam portion 82, spring arm 85 is distorted to bring one of the contacts 86 into engagement with fixed contact 58. However, when cam 81 is rotated until the corresponding shoulder 84 passes follower 87, so that the follower now engages cam portion 83, spring arm 85 is allowed to relax until the other of movable contacts 86 engages fixed contact 61, it being understood that this operation results in disengagement of the first movable contact from fixed contact 58. The time switch device is so constructed that shaft 66 completes one revolution per hour, so long as motor 26 is energized, and that the follower 87 engages that end of cam surface 82 immediately adjacent to the leading one of shoulders 84. Cam portion 82 extends for slightly more than 180°, and portion 83 extends for slightly less than 180°. Accordingly, follower 87 remains in engagement with portion 82 for thirty seconds more than the first one-half hour of operation of the time switch, at which point the trailing one of shoulders 84 passes beneath the follower and the follower is engaged with cam portion 83. The leading one of shoulders 84 passes beneath follower 87 thirty seconds before the end of the one hour time period. Accordingly, it will be understood that the operation of the cam switch mechanism illustrated in FIG. 3 is effective first to maintain one movable contact 86 engaged with fixed contact 58 for the first one-half hour plus thirty seconds, then to maintain the other movable contact 86 engaged with fixed contact 61 until thirty seconds before the end of the one hour period, and then to re-engage the first movable contact 86 with fixed contact 58.

Figure 4:
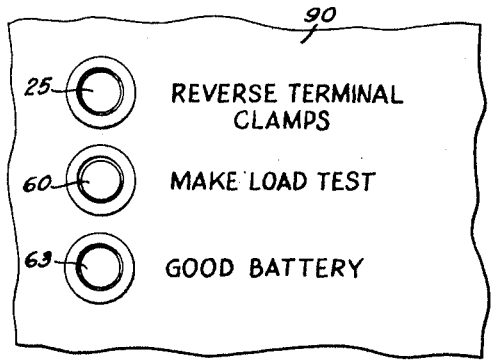
FIG. 4 is a fragmentary front elevational view of the battery charger of FIG. 1, illustrating certain indicator lamps and a portion of the battery charger casing bearing indicia cooperating with the indicator lamps.

Indicator lamps 25, 60 and 63 are of distinctly different color and, as seen in FIG. 4, are mounted in openings in a portion 90 of the casing for the battery charger, so that all three of the indicator lamps are grouped together for observation by the operator of the battery charger. Casing portion 90 is provided with appropriate indicia, as shown, cooperating with indicator lamps 25, 60 and 63 to properly instruct the operator in accordance with the manner in which the battery charger has functioned automatically. Thus, a legend "REVERSE TERMINAL CLAMPS" is provided immediately adjacent to lamp 25, a second legend "MAKE LOAD TEST" is provided immediately adjacent lamp 60, and a third legend "GOOD BATTERY" is provided immediately adjacent indicator lamp 63, so that energization of any one of the lamps will direct the operator's attention to a corresponding one of the legends.

Energization of lamp 25 results only when the battery to be charged has been connected with the wrong polarity. Under these circumstances, contacts 18 of contactor 19 do not close and charging will not proceed. As will be clear from FIG. 4, energization of lamp 25 instructs the operator to reverse terminal clamps 15 and 16, so correcting the erroneous connection of the charger to the battery.

Lamp 60 may be energized under either of two circumstances. In each circumstance, relay 9 is de-energized at a time when the time switch device maintains a movable contact of contact set 29 in engagement with fixed contact 58. First, this may occur if the battery being charged attains the predetermined terminal voltage, to which control circuit 30 is to respond, within the first one-half hour plus thirty seconds of charging. If this occurs, it is known that the battery being charged either had an unusually high initial state of charge, and therefore is now satisfactorily charged, or has excessively sulfated plates, a defective condition causing an unusually rapid increase in terminal voltage during charging. The usual load test, carried out with any suitable storage battery tester, will accordingly indicate conclusively whether the battery is good or bad. Hence, the legend "MAKE LOAD TEST" provided on casing portion 90 adjacent to lamp 60 is applicable. Second, lamp 60 will be energized in the event that the battery being charged has not reached the predetermined terminal voltage by the end of the full one hour period of operation of the time switch device. Under these circumstances, it is most likely that the battery is fatally defective. There is, however, some possibility that the initial state of charge of the battery was so that even the full hour of charging was not adequate, the battery being otherwise satisfactory. A conventional load test will distinguish between these two situations. Hence, the legend "MAKE LOAD TEST" provided on casing portion 90 adjacent to lamp 60, is again applicable, instructing the operator to follow the proper procedure for this particular battery.

Indicator lamp 63 is energized only when a movable contact of contact set 29 engages fixed contact 61 while relay 9 is de-energized. This can occur only as a result of the battery reaching the predetermined terminal voltage within that time period during which the mechanism described with reference to FIG. 3 causes one of the movable contacts 86 to engage fixed contact 61. Normal batteries presented for charging ordinarily will attain the desired predetermined terminal voltage at some time within the second one-half hour of charging and, therefore, within that time period just mentioned. Accordingly, the legend "GOOD BATTERY" provided on casing portion 90 immediately adjacent to lamp 63 is applicable, telling the operator that this particular battery is in good condition and has been successfully charged.

It will be noted that the motor 26 of the time switch device, being connected between conductors 4 and 7, receives current only so long as relay 9 is energized. It is for this reason that contact set 28 is provided in parallel with transistor 48, assuring that relay 9 will not be de-energized during the first one-half hour of charging, regardless of whether or not the battery reaches its predetermined terminal voltage. Thus, in effect, contact set 28 of the time switch device bypasses the voltage-responsive control provided by circuit 30.

Inclusion of temperature responsive resistance 17, in such fashion as to respond directly or indirectly to the temperature of battery B, is an important feature of the battery charger illustrated. As will be apparent from the foregoing description, automatic operation of the battery charger places considerable reliance upon the battery either attaining or failing to attain the predetermined terminal voltage within predetermined time periods of charging. It has been found that very cold batteries exhibit a higher on-charge voltage than do warm batteries so that, if the control circuit 30 responded to the same terminal voltage for all batteries, this voltage, and therefore the end of charging, would be reached more quickly in the case of a cold battery. Accordingly, the predetermined time period of chraging might be inadequate for a particularly cold battery. To compensate for this, the thermally responsive resistance 17 is included in the voltage divider of control circuit 30 in such manner that, when a cold battery is being charged, so that the temperature of resistance 17 is lowered, the voltage at the output terminal of the voltage divider is depressed in accordance with the low temperature of the battery. The output voltage of the voltage divider having been depressed, a higher battery terminal voltage is now required to provide the proper voltage to render Zener diode 42 conductive. The resistance 17 thus compensates circuit 30 to prevent an undue shortening of the time period of charging which occurs before the Zener diode is rendered conductive and, in effect, determines that cold batteries will be subjected to at least the same amount of charging as warm batteries.

It will be understood that the timer means described with reference to FIGS. 2 and 3 is operative to define two concurrently commencing time periods of different length. Operated by cam 65 of the timer means, contact set 28 is effective both to assure that charging will proceed for the shorter of the two time periods (e.g., the first thirty minutes), regardless of the terminal voltage of the battery being charged, and that charging will be terminated at the end of the shorter time period, but not before, in the event that the desired terminal voltage of the battery is attained during the shorter time period. Also operated by cam 65 of the timer means, contact set 27 is effective to accomplish termination of charging at the end of the longer of the two time periods (e.g., after the full one hour cycle), in the event that charging has not been earlier terminated by operation of contact set 28 or control circuit 30.

While, in the embodiment chosen to illustrate the invention, the particularly advantageous transistor circuit 30 has been disclosed, it will be understood that other types of relay actuating circuits can be employed in accordance with the invention. Similarly, other time switch means than the specific mechanisms of FIGS. 2 and 3 can be employed. Also, it will be understood by those skilled in the art that the particular indicia illustrated in FIG. 4, while advantageous, is subject to change in accordance with the specific requirements at hand. Accordingly, it will be understood that the invention is subject to various changes and modifications, without departing from the scope thereof as defined in the appended claims.

I claim:

1. In a battery charger, the combination of a charging circuit; control means responsive to terminal voltage of the battery being charged and normally operative to interrupt said charging circuit in response to occurrence of a predetermined battery terminal voltage; timer means operative to determine two concurrently commencing time periods of different length; first means controlled by said timer means and operative to prevent said control means from interrupting said charging circuit during the the shorter of said time periods and to accomplish interruption of said charging circuit at the end of said shorter period in event of occurrence of said predetermined battery terminal voltage during said shorter period; second means controlled by said timer means and operative to interrupt charging at the end of the longer of said time periods when charging has not been earlier terminated; and means responsive to operation of said first and second means and said control means for indicating to the operator the proper handling of the battery subsequent to termination of charging.

2. A battery charger in accordance with claim 1 and wherein said last-mentioned means comprises a first indicator operated in response to interruption of said charging circuit by said first and second means, and a second indictor operated in response to interruption of said charging circuit by said control means.

3. A battery charger in accordance with claim 2 and wherein each of said indicators includes a lamp exposed for view by the operator and indicia displayed adjacent to said lamp.

4. A battery charger adapted for charging batteries having a first terminal voltage and for charging batteries having a second higher terminal voltage comprising, in combination, rectifier means adapted to be connected to the battery to be charged to supply a charging current thereto, adjustable circuit means adapted to connect said rectifier means to a source of alternating current for adjustably energizing said rectifier in accordance with the terminal voltage of the battery being charged, timing means for controlling the energization of said rectifier means from said source so as to supply a charging current to said battery for at least a predetermined minimum period of time but not longer than a predetermined maximum period of time, first voltage sensitive relay means connected to said battery and adapted to disconnect said rectifier means from said source when said battery attains a full state of charge between said predetermined minimum and maximum charging periods, and second voltage sensitive relay means connected to said battery and adapted to be energized only when said charger is connected to batteries having said higher terminal voltage, said second voltage sensitive relay means being connected when energized to change the sensitivity of said first voltage relay means and to adjust the energization of said rectifier means from said alternating current source.

5. In a battery charger, the combination of a charging circuit for connection to at least one battery to supply charging current thereto; a timing device comprising drive means placed in operation by initiation of operation of said charging circuit, said timing device being operative to define a shorter time period of charging via said charging circuit and a longer, simultaneously initiated, subsequently terminated time period of charging via said charging circuit; control means operatively connected to said charging circuit to control the same; an actuating circuit responsive to terminal voltage of the battery being charged and operatively connected to said control means to actuate the same when the terminal voltage of the battery reaches a predetermined value, the combination of said timing device and control means being operative to terminate charging subsequent to said shorter time period when the terminal voltage of the battery being charged attains said predetermined value during said longer time period and said timing device being operative to terminate charging at the end of said longer period when the terminal voltage of the battery fails to reach said predetermined value; indicia displayed for view by the operator, and means operated by said drive means, said means operated by said drive means including means cooperating with said indicia to indicate to the operator the proper handling of the battery subsequent to termination of charging.

6. In a battery charger, the combination of a charging circuit for connection to at least one battery to supply charging current thereto; a timing device placed in operation by initiation of operation of said charging circuit, said timing device being operative to define a shorter time period of charging via said charging circuit and a longer, simultaneously initiated, subsequently terminated time period of charging via said charging circuit; control means operatively connected to said charging circuit to control the same; an actuating circuit responsive to terminal voltage of the battery being charged and operatively connected to said control means to actuate the same when the terminal voltage of the battery reaches a predetermined value, the combination of said timing device and control means being operative to terminate charging subsequent to said shorter time period when the terminal voltage of the battery being charged attains said predetermined value during said longer time period and said timing device being operative to terminate charging at the end of said longer period when the terminal voltage of the battery fails to reach said predetermined value; and indicia displayed for view by the operator to indicate to the operator the proper handling of the battery subsequent to termination of charging.

7. In a battery charger, the combination of a charging circuit for connection to at least one storage battery to supply charging current thereto; a timing device having two switches, said timing device being constructed and arranged to accomplish actuation of one of said switches at the end of a shorter time period and actuation of the other of said switches at the end of a longer time period with said longer time period terminating subsequent to said shorter time period; a control means operatively connected to said charging circuit to control the same; an actuating circuit connectable to the battery to be charged and constructed to respond to the terminal voltage thereof to actuate said control means when the terminal voltage of the battery reaches a predetermined value, said one switch and said control means being operatively connected to effectively terminate charging subsequent to said shorter time period but before the end of said longer time period when the terminal voltage of the battery reaches said predetermined value, said other switch being operatively connected to effectively terminate charging at the end of said longer time period; and indicia carried by the battery charger and displayed for view by the operator to indicate to the operator the proper handling of the battery in accordance with the circumstances of termination of charging thereof by said switches and control means, said timing device being connected to be de-energized by said switches and control means.

8. A battery charger in accordance with claim 7 and wherein said control means is an electromagnetic relay having normally open contacts and an actuating winding, said actuating circuit is constructed and arranged to maintain said actuating winding energized, causing the contacts of said relay to be closed, only so long as the terminal voltage of the battery being charged is below a predetermined value.

9. In a battery charger, the combination of a charging circuit;
control means responsive to the terminal voltage of the battery being charged,
said control means being connected to said charging circuit to effectively terminate charging in response to occurrence of a predetermined battery terminal voltage;
timer means operative to determine a shorter time period and a longer time period with said shorter period being concurrent with a portion of said longer period and said longer period terminating a predetermined time after termination of said shorter period,
said timer means including first switch means connected to prevent said control means from terminating charging until the end of said shorter time period in the event of occurrence of said predetermined battery terminal voltage during said shorter time period,
said timer means further including second switch means connected to terminate charging at the end of said longer time period in the event that charging is not earlier terminated; and
indicating means operated by said timer means and said control means and responsive to termination of charging at the end of said shorter time period for indicating to the operator that the battery being charged should be subjected to testing.

10. A battery charger according to claim 9 wherein said indicating means comprises
a lamp, and
an energizing circuit in which said lamp is connected and which is completed by said timer means and said control means when charging is terminated at the end of said shorter time period;
the battery charger further comprising
other indicating means to indicate to the operator that the battery being charged is in satisfactory condition, said other indicating means comprising
a second lamp, and
an energizing circuit in which said second lamp is connected and which is completed by said timer means and said control means when charging is terminated in response to occurrence of said predetermined battery terminal voltage at a time subsequent to termination of said shorter time period.

11. A battery charger according to claim 10 and further comprising
other indicating means operated by said timer means and said control means and responsive to termination of charging in response to occurrence of said predetermined battery terminal voltage after termination of said shorter time period and before termination of said longer time period.

References Cited by the Examiner
UNITED STATES PATENTS

| | | | |
|---|---|---|---|
| 2,979,650 | 4/61 | Godshalk et al. | 320—35 |
| 2,987,663 | 6/61 | Medlar | 320—38 |

LLOYD McCOLLUM, *Primary Examiner.*

ORIS L. RADER, ROBERT L. SIMS, *Examiners.*